United States Patent [19]

Myers

[11] 4,052,695

[45] Oct. 4, 1977

[54] BREAKAWAY PROTECTION FOR ELECTRICALLY CONTROLLED TRAILER BRAKES

[75] Inventor: Philip E. Myers, Beloit, Wis.

[73] Assignee: Warner Electric Brake & Clutch Company, South Beloit, Ill.

[21] Appl. No.: 658,459

[22] Filed: Feb. 17, 1976

[51] Int. Cl.² .................... B60T 7/20; H01H 27/04
[52] U.S. Cl. ........................... 340/52 D; 188/3 R; 280/432; 303/20; 340/275
[58] Field of Search .............. 340/52 R, 53, 275, 282, 340/249, 248 C, 52 D; 307/10 R; 280/432; 188/3 R, 112; 303/3, 7, 15, 20

[56] References Cited

U.S. PATENT DOCUMENTS

| 2,000,999 | 5/1935 | Suchland | 340/52 R |
|---|---|---|---|
| 2,305,603 | 12/1942 | Cadman | 340/275 |
| 3,062,326 | 11/1962 | Jones et al. | 340/52 R |
| 3,689,717 | 9/1972 | Westenhaver | 340/52 D |
| 3,795,905 | 3/1974 | Wright | 340/251 |
| 3,907,071 | 9/1975 | Wells | 188/3 R |
| 3,967,257 | 6/1976 | Hager | 340/248 C |

Primary Examiner—John W. Caldwell, Sr.
Assistant Examiner—Joseph E. Nowicki
Attorney, Agent, or Firm—Leydig, Voit, Osann, Mayer & Holt, Ltd.

[57] ABSTRACT

A control system of the type which provides "breakaway" safety action to energize the electrically actuatable coils of brakes in a trailer pulled by a towing vehicle, the coils being energized under a breakaway condition from an auxiliary battery carried in the trailer. The present system is characterized by a voltage threshold indicator which is connected across the auxiliary battery and the coils and which enables the driver to test the auxiliary battery and clearly determine if the battery has sufficient storage capacity to keep the coils adequately energized while load current is being drawn from the battery and supplied to the actual coils themselves. The indicator preferably is incorporated in a pull-apart breakaway switch unit which automatically connects the brake coils with the auxiliary battery in the event of a breakaway.

8 Claims, 2 Drawing Figures

4,052,695

BREAKAWAY PROTECTION FOR ELECTRICALLY CONTROLLED TRAILER BRAKES

BACKGROUND OF THE INVENTION

The present invention relates to breakaway protection for a trailer which is adapted to be hitched to a towing vehicle such as an automobile or truck. More particularly, the invention is adapted for use with a trailer having wheels with brakes which are engaged when associated electrical coils are energized from the towing vehicle during normal towing operations.

The trailer can sometimes break loose from the towing vehicle and run wildly down the road. To prevent this, a breakaway switch is provided between the towing vehicle and the trailer. If the trailer breaks loose, the breakaway switch is automatically rendered conductive and energizes the brake coils by means of an auxiliary battery which is carried on the trailer. But it the auxiliary battery is weak or dead and does not have sufficient storage capacity to adequately energize the coils, the brakes will not be safely applied during breakaway and the trailer thus can run wildly.

SUMMARY OF THE INVENTION

The general aim of the present invention is to provide a simple method and low cost apparatus with which the driver may test the auxiliary battery to determine not only whether the battery has sufficient voltage to initially energize the brake coils but also whether the battery has adequate storage capacity to hold such voltage and keep the coils safely energized for a sustained period during breakaway.

A relative object is to provide battery testing method and apparatus to enable the driver to determine whether the auxiliary battery is capable of maintaining sufficient voltage to keep the coils energized when load current is being drawn from the battery and is actually being supplied to the coils.

A more detailed object is to provide battery-checking apparatus having a voltage threshold indicator which is adapted to be connected across the battery and/or the brake coils and which informs the driver that the battery is good only if the battery holds its voltage at or above a predetermined threshold value while supplying current to the actual load formed by the brake coils.

The invention also resides in the novel incorporation of the voltage threshold indicator in the breakaway switch unit itself and in the use of the indicator to check the integrity of the switch.

DETAILED DESCRIPTION OF THE PREFERRED EMBODIMENT

Figure 1:
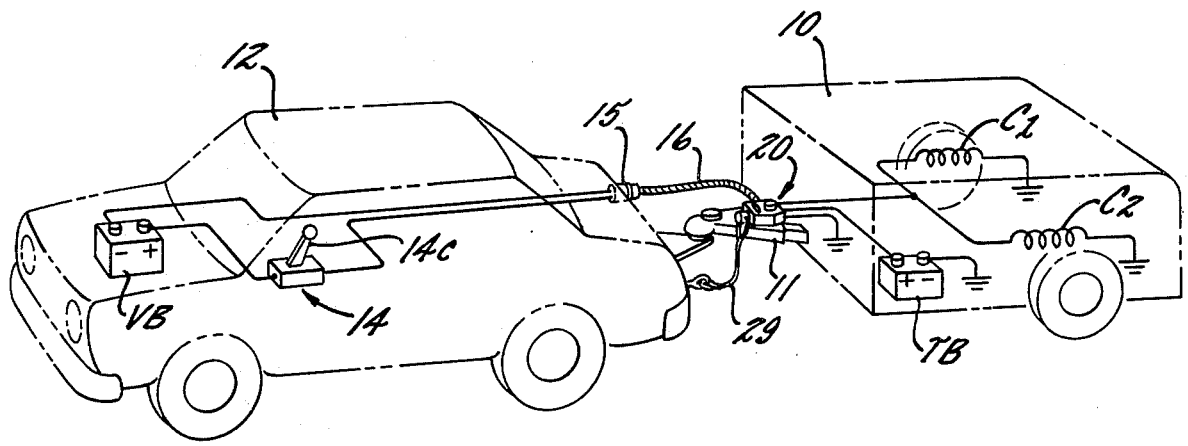
FIG. 1 is a diagrammatic perspective illustration of a trailer equipped with electrically actuatable brakes and removably hitched to a towing vehicle.

Referring to the diagrammatic perspective of FIG. 1, a trailer 10 is shown coupled by a removable hitch 11 to a towing vehicle 12. The latter may be an automobile, truck or tractor and will here be referred to as simply the vehicle. In well known and conventional fashion, the towing vehicle carries a voltage source, here a 12-volt battery VB, connected into its electrical system, and also a hand or foot controller 14 comprising a rheostat or resistor 14a (FIG. 2) along which a wiper 14b is slidable by the setting of a control lever 14c.

When the hitch 11 is hooked up, the user joins the plug and socket parts of a disengageable, multi-terminal electrical connector 15 at the rear of the vehicle 12, so that connections are established via a cable 16 for controllable energization of brake coils C1 and C2 on the trailer 10, as well as connections for the trailer lights and other electrical components. The connector 15 is here shown in its most simple form as having two pairs of mating disengageable terminals 15a and 15b (FIG. 2) connected to the coils by lines $L_1$ and $L_2$ which lead from the cable 16.

Because the details of the brake construction are well known and per se form no part of the invention, it will suffice to note that the wheels of the trailer 10 are equipped with brakes, preferably of the electromagnetic type, respectively associated with the coils $C_1$ and $C_2$. When energized or excited by electric current, these coils cause the wheel brakes to be actuated or engaged to produce braking torque which is preferably proportional to the magnitude of the exciting current. The coils $C_1$ and $C_2$ may be conveniently considered to be a single coil C inasmuch as the two coils are normally connected in parallel and, in any event, the invention to be described can be applied to a single brake having a single coil or to several brakes controlled by only one coil.

Figure 2:
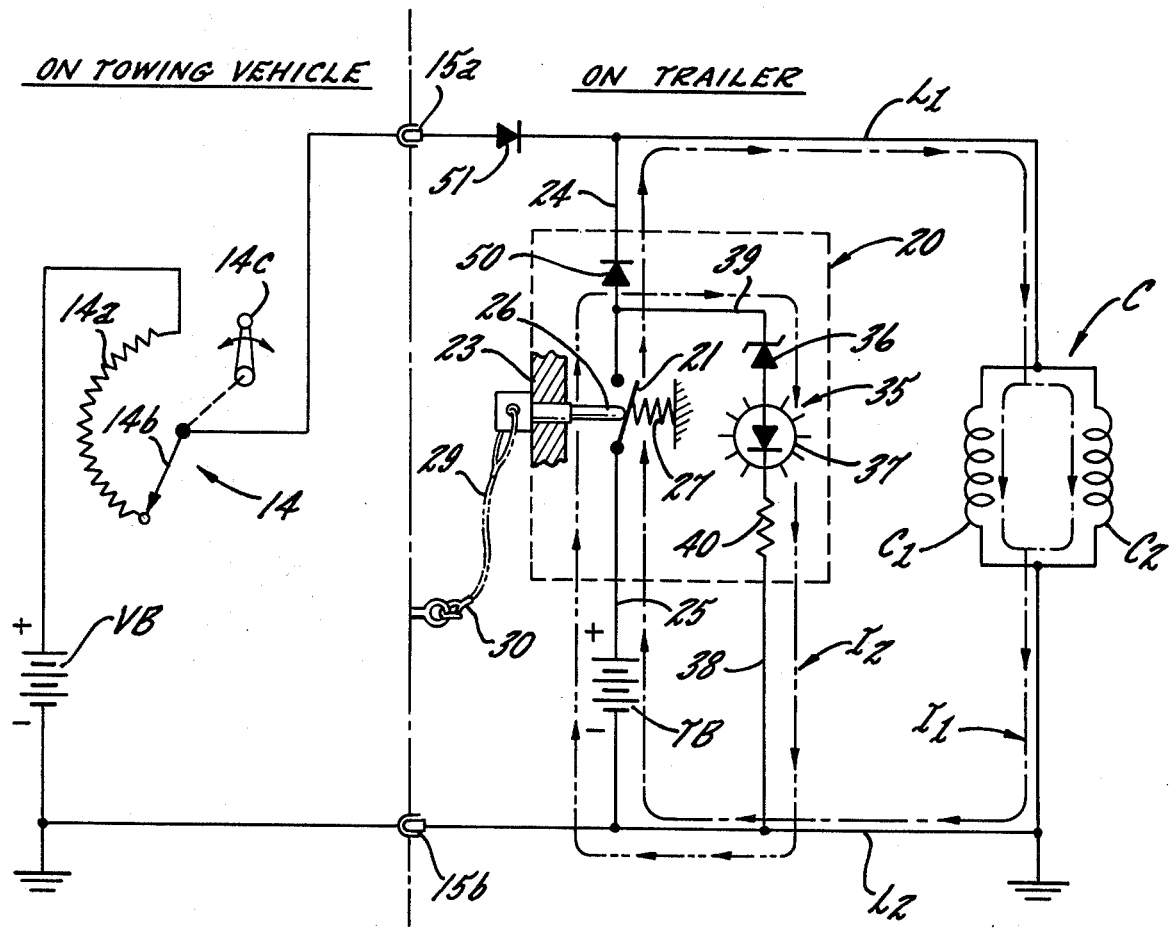
FIG. 2 is a schematic circuit diagram of a safety system constituting an exemplary embodiment of the present invention.

During normal towing operations, the coil C is variably energized by current flow through the connector 15 and the cable 16 according to the vehicle driver's setting of the lever 14c. The rheostat 14a for variably energizing the trailer brake coil C under normal driving conditions is shown in FIG. 2 as having one end connected to the positive terminal of the battery VB and as having the wiper 14b connected through the terminals 15a directly to the coil C by the line $L_1$ and thence to the negative terminal of the battery by the line $L_2$ and the terminals 15b. While the modulated or variable energization of the brake coil C forms no part of the present invention, it will be understood that by movement of the lever 14c and wiper 14b, the driver of the towing vehicle may under ordinary circumstances controllably apply the trailer brakes by varying the energizing current through the coil C.

It has been a recognized danger that the trailer 10 might be pulled or "broken away" from the vehicle 12 if the hitch 11 fails on hills, rough roads or in an accidental collision. This would, of course, separate the connector 15 (or equivalently break the cable 16) to leave the brake coil C with no source of current from the vehicle battery VB and thus leave the brakes fully released. A heavy two wheel trailer (and all the more, a four, six or eight wheel trailer) may roll wildly out of control and possibly create severe damage or injury in such circumstances. Thus, it has been an accepted practice to provide an auxiliary battery TB on the trailer and to connect the auxiliary battery to the brake coil C by a safety control circuit which acts to fully energize the coil from the auxiliary battery whenever the trailer, for any reason, "breaks away" from the towing vehicle.

One such safety control circuit is shown in FIG. 2 and includes a breakaway switch unit 20 having a switching device 21 which is adapted to be actuated to a given state (herein, a conductive or "closed" state) whenever the trailer 10 breaks away from the towing vehicle 12.

In this instance, the switching device 21 is mounted within or otherwise associated with a first part in the form of a housing 23 carried on the hitch 11 of the trailer. One terminal of the switch 21 is connected to the line $L_1$ by a lead 24 extending from the housing 23 while the other terminal of the switching device is connected to the positive terminal or post of the auxiliary battery TB by another lead 25 extending from the housing. The negative post of the battery TB is connected to the line $L_2$ and thus that battery, the switch 21 and the coil C are connected in a series path which conducts excitation current $I_1$ from the battery to the coil when the switch is conductive.

The breakaway switch unit 20 further includes a second part 26 (FIG. 2), herein shown as a pin, adapted to be detachably joined to the housing 23 and adapted, when so joined, to render the switch 21 non-conductive by holding the switch open against the bias of a spring 27. The pin 26 is telescoped snugly but removably into a hole in the housing 23 and is attached to a lanyard 29 which, in turn, is adapted to be connected to the towing vehicle 12 by a releasable snap hook 30.

Instructions which accompany the breakaway switch unit 20 inform the driver to keep the pin 26 plugged into the housing 23 when the trailer 10 is parked. As a result, the pin maintains the switch 21 in an open condition to avoid discharging the battery TB through the coil C. The driver is further instructed to connect the lanyard 29 to the towing vehicle 12 each time the trailer is coupled to the towing vehicle. Thus, if the trailer breaks away, the pin 26 will be jerked from the housing 23 to effect automatic closing of the switch 21 and automatic energization of the coil C via the auxiliary battery TB.

In such breakaway safety control systems, a serious problem can arise. That is, the auxiliary battery TB may (and often will) be neglected for long periods when the trailer 10 is stored. It thus may self-discharge, dehydrate, degrade due to aging or otherwise become defective and incapable of supplying the necessary energizing current to the brake coil C. If the driver tows the trailer with a dead or ineffective auxiliary battery, there is no breakaway safety capability and thus a dangerous condition exists. The driver should, therefore, test the auxiliary battery each time the trailer is hitched to the towing vehicle and before the trailer is towed.

The present invention contemplates the provision of extremely simple method and apparatus for enabling the driver to test the output voltage of the auxiliary battery TB and, more importantly, to effectively test to determine whether the auxiliary battery has the capacity of maintaining a sufficiently high voltage to adequately energize the coil C when the battery is actually connected across the coil and a sustained load current is being drawn from the battery. To gain a full appreciation of the invention, it should be understood that a defective but not completely dead battery may be capable of producing its full rated output voltage across its posts when the battery is not under load but that the output voltage drops sharply when a load is placed across the battery and load current is drawn therefrom. Accordingly, testing of the output voltage of the auxiliary battery TB when the latter is unloaded can provide the driver with a false indication that the battery is "good" when in fact the battery is not capable of keeping the coil C acceptably energized for any appreciable length of time. Such false indications are avoided by the present invention inasmuch as the voltage of the auxiliary battery is checked while the battery is supplying excitation current to the actual load or coil C and thus the driver is informed as to whether the auxiliary battery is sufficiently "strong" to keep the coil effectively energized under a breakaway condition.

In carrying out the invention, provision is made of a voltage threshold indicating device 35 (FIG. 2) which is adapted to be connected across the auxiliary battery TB and/or the coil C and which responds and produces a detectable signal only when the voltage applied to the indicating device equals or exceeds a predetermined value sufficient to keep the coil adequately energized. While various types of voltage threshold indicating devices may be utilized, the preferred device 35 comprises the series combination of (i) a Zener diode 36 and (ii) an audio or visual signal producer which is here shown as being a light-emitting diode (LED) 37. The device 35 is preferably but not necessarily incorporated in the breakaway switch unit 20 and, in the present instance, both the Zener diode 36 and the LED 37 are enclosed by the housing 23 with the LED being visible from the top of the housing by means of a transparent window (not shown) in the housing. One terminal of the LED 37 is connected to the anode terminal of the Zener diode 36 while the other terminal of the LED is in series with a current-limiting resistor 40 and is connected to the line $L_2$ by a lead 38 extending from the housing 23. The cathode terminal of the Zener diode 36 is preferably connected to the lead 24, and thus the line $L_1$, by a lead 39 within the housing 23 although the cathode terminal could be connected to the positive post of the battery TB by the leads 39 and 25.

With the foregoing arrangement, the voltage threshold indicating device 35 comprising the series combination of the Zener diode 36 and the LED 37 is connected substantially in parallel across the coil C and is connected in parallel across the series combination of the auxiliary battery TB and the switch 21. Thus, the voltage applied to the Zener diode corresponds substantially to the voltage across the battery TB when the switch 21 is closed and excitation current $I_1$ is drawn from the battery and supplied to the coil C. As is well known, a Zener diode is a voltage sensitive breakdown device which conduits current reversely (i.e., from its cathode to its anode) only when the voltage applied to the diode equals or exceeds a predetermined threshold or breakdown value established by the inherent characteristics of the diode. Once the diode breaks down and conducts reversely, the voltage drop across the diode remains substantially constant irrespective of the magnitude of the current flow through the diode.

The Zener diode 36 which is used with a given safety control circuit is selected such that the diode will not break down and conduct reversely until the voltage applied to the diode is at least sufficient to adequately energize the coil C. For example, if the coil C requires a minimum of 10 volts to effect safe braking, the Zener diode which is used in the circuit is one which will not conduct reversely until the voltage applied thereto reaches a threshold value of at least 10 volts.

In using the described voltage threshold indicating device 35 to test the capacity of the auxiliary battery TB, the driver —per instructions which accompany the breakaway switch unit 20—pulls the pin 26 from the housing 23 and thereby effects manual closing of the switch 21 while the trailer 10 is parked. Closure of the switch connects the coil C across the battery TB so that excitation current flows from the battery to the coil along the path $I_1$. If the battery TB has sufficient capacity to adequately energize the coil, the voltage across the battery will remain at or above the threshold value of the Zener diode 36 and thus the latter will break down and reversely conduct current along a path $I_2$ from the positive post of the battery through the lead 25, the switch 21 and the leads 24 and 39, thence through the diode and the LED 37 and then back to the negative post of the battery via the lead 38 and the line $L_2$. Such current will energize the LED 37 and cause the latter to light, thereby to provide the driver with a visual signal that the battery TB has sufficiently high voltage to initially energize the coil. If the LED remains lit for a predetermined minimum period of time (e.g., 10 seconds), the driver is informed that the battery has sufficient capacity to hold its voltage and adequately energize the coil even when a sustained load current is being drawn from the battery and through the coil.

In the case of a dead auxiliary battery TB, the current $I_2$ will not flow when the driver manually pulls the pin 26 and thus the LED 37 will not light. Accordingly, the lack of response of the LED informs the driver that the battery is dead. If the battery is defective but not completely dead, the initial voltage across the battery may be sufficiently high to cause the Zener diode 36 to conduct current $I_2$ to the LED when the pin is first pulled. Very shortly thereafter, however, the battery voltage will drop below the breakdown voltage of the Zener diode 36 as a result of a sustained load current being drawn from the battery and through the coil C. The diode thus will cease conducting current $I_2$ and the LED will go out. Hence, if the LED lights only momentarily, the driver is warned that the auxiliary battery is not sufficiently good to hold its voltage under load and thus cannot adequately energize the coil upon breakaway.

Preferably, an isolating diode 50 is placed in the lead 24 between the lead 39 and the line $L_1$ and is poled as shown in FIG. 2. The isolating diode prevents the flow of current from the vehicle battery VB to the Zener diode 36 and the LED 37 when the trailer 10 is hitched to the towing vehicle 12 and the connector terminals 15a and 15b are joined. Thus, the diode 50 prevents the LED from being energized and lit during normal towing of the trailer and further prevents the LED from being energized from the vehicle battery if the terminals 15a and 15b are joined when the driver pulls the pin 26 to test the auxiliary battery TB. Those familiar with the art will appreciate that the circuit shown in FIG. 2 may include other components such as a diode 51 to prevent the battery TB from discharging through the electrical system of the towing vehicle 12 if the pin 26 is pulled while the terminals 15a and 15b are joined, and also may include means (not shown) to enable charging of the auxiliary battery TB from the electrical system of the towing vehicle.

From the foregoing, it will be apparent that the present invention provides a very simple method and an inexpensive apparatus for checking the capacity of the auxiliary battery TB when the latter is supplying current to the actual load (i.e., the coil C) which the battery must energize under an emergency condition. The described arrangement also serves to check the switch 21 itself because, if the switch is defective and does not close when the driver manually pulls the pin 26, current $I_2$ will not be conducted to the LED 37 and the latter will not light. If the LED still does not light after replacement of the auxiliary battery TB, the driver is informed that the switch 21 is defective or that the circuit path $I_2$ has in some way been interrupted.

As pointed out above, the lead 39 could be connected to the lead 25 rather than to the lead 24. In such an instance, the series combination of the Zener diode 36 and the LED 37 would be connected directly across the battery TB rather than across the series combination of the battery and the switch 21. As long as the battery TB is "good," the LED would be lit constantly but an LED draws such low current that the drain on the battery would be virtually insignificant. With such an arrangement, a shield (not shown) may be associated with the pin 26 and arranged to cover and conceal the LED in the housing 23 as long as the pin is plugged into the housing. Thus, the driver could not see the LED when the switch 21 is open and the LED is not connected across the coil C. But when the driver pulls the pin to close the switch and connect the LED across the coil, the shield would uncover the LED and the driver then would be informed as to the condition of the battery (but not the switch) by the response or lack of response of the LED. That is, the LED will remain lit if the battery is good but will not light or will very quickly de-energize upon closure of the switch if the battery is not capable of adequately energizing the coil C.

I claim:

1. A safety system for use with a trailer adapted to be removably hitched to a towing vehicle and having a brake which is engaged when an associated coil is energized by a battery carried by said trailer, said safety system including first and second separable parts which are normally connected to one another both when the trailer is hitched to and is intentionally unhitched from the towing vehicle, said first part being connected to the trailer, said second part being connected to the towing vehicle to remain with the latter and to separate from said first part when the trailer is accidentally unhitched but being manually releasable from the towing vehicle and capable of remaining connected to said first part when the trailer is intentionally unhitched, a switching device carried by said first part and physically actuated to a non-conductive state by virtue of being physically engaged by said second part when said parts are connected, said switching device being rendered conductive when said parts are separated, and means for connecting said switching device in a series path with said battery and said coil whereby current is supplied to said coil from said battery when said parts are separated and said switching device is conductive, the improvement in said safety system comprising:

a. a voltage indicator which responds only when the voltage applied thereto equals or exceeds a predetermined threshold value adequate to energize said coil, and b. circuit connections placing said indicator electrically across said battery and said coil when said first and second parts are separated and said switching device is conductive, whereby a user may manually separate said parts while the trailer is standing still and will be advised by the presence or absence of a response from said indicator that the battery is capable or incapable, respectively, of maintaining a predetermined value of voltage while the normally expected load current is drawn therefrom by said coil.

2. A breakaway switch for use with a trailer adapted to be removably hitched to a towing vehicle and having a brake which is engaged when an associated coil is supplied with excitation current from a battery carried by said trailer, said breakaway switch including first and second separable parts which are normally connected to one another both when the trailer is hitched to and is intentionally unhitched from the towing vehicle, said first part being connected to the trailer, said second part being connected to the towing vehicle to remain with the latter and to separate from said first part when the trailer is accidentally unhitched but being manually releasable from the towing vehicle and capable of remaining connected to said first part when the trailer is intentionally unhitched, a switching device carried by said first part and physically actuated to a non-conductive state by virtue of being physically engaged by said second part when said parts are connected, said switching device being rendered conductive when said parts are separated, and first means for connecting said switching device in a series path with said battery and said coil whereby excitation current is supplied to said coil when said parts are separated and said switching device is conductive, the improvement in said breakaway switch comprising, a voltage sensitive threshold indicator carried by said first part for producing a detectable signal only when the voltage applied to said indicator is at or above a predetermined threshold value adequate to energize said coil, and second means for electrically connecting said indicator across said coil or said battery whereby the voltage applied to said indicator corresponds substantially to the voltage across said coil or said battery when said switching device is conductive and excitation current is supplied to said coil from said battery.

3. A breakaway switch as defined in claim 2 in which said second means connect said indicator electrically in parallel across the series combination of said battery and said switching device.

4. A breakaway switch as defined in claim 2 in which said voltage sensitive threshold indicator comprises a voltage sensitive breakdown device and further comprises a light emitter, said breakdown device causing current to be conducted from said battery to said light emitter when the voltage applied to said breakdown device is at or above said predetermined threshold value.

5. A breakaway switch as defined in claim 4 in which said breakdown device comprises a Zener diode and in which said light emitter comprises a light-emitting diode.

6. A breakaway switch as defined in claim 2 in which said first means are operable to connect a first terminal of said switching device to a first terminal of said coil and to connect a second terminal of said switching device to a first terminal of said battery, said second means being operable to connect a first terminal of said indicator to the first terminals of said switching device and said coil and to connect a second terminal of said indicator to a second terminal of said coil and a second terminal of said battery.

7. A breakaway switch as defined in claim 2 further including means in said series path for preventing voltage from being applied to said indicator when said switching device is non-conductive and said coil is energized by a voltage source carried by said towing vehicle.

8. A breakaway switch for use with a trailer adapted to be removably hitched to a towing vehicle and having a brake which in engaged when an associated coil is supplied with excitation current from a battery carried by said trailer, said breakaway switch including first and second separable parts which are normally connected to one another both when the trailer is hitched to and is intentionally unhitched from the towing vehicle, said first part being connected to the trailer, said second part being connected to the towing vehicle to remain with the latter and to separate from said first part when the trailer is accidentally unhitched but being manually releasable from the towing vehicle and capable of remaining connected to said first part when the trailer is intentionally unhitched, a switching device carried by said first part and physically actuated to a non-conductive state by virtue of being physically engaged by said second part when said parts are connected, said switching device being rendered conductive when said parts are separated, and first means for connecting a first terminal of said switching device to a first terminal of said coil, for connecting a second terminal of said switching device to a first terminal of said battery and for connecting a second terminal of said battery to a second terminal of said coil whereby excitation current is supplied to said coil from said battery when said parts are separated and said switching device is conductive, the improvement in said breakaway switch comprising, a voltage sensitive threshold indicator carried by said first part for producing a detectable signal only when the voltage applied to said indicator is at or above a predetermined threshold value, second means for connecting a first terminal of said indicator to said first terminal of said switching device and to said first terminal of said coil and for connecting a second terminal of said indicator to said second terminal of said battery and to said second terminal of said coil, said indicator comprising a voltage sensitive breakdown device and further comprising a light emitter connected in series with said breakdown device, said breakdown device causing current to be conducted from said battery to said light emitter only when the voltage applied to said breakdown device is at or above said predetermined threshold value whereby a user may manually separate said parts while the trailer is standing still and said emitter will create light only if the battery maintains a predetermined value of voltage while the normally expected load current is being drawn therefrom by said coil.

* * * * *